United States Patent [19]
Cheng

[11] Patent Number: 5,462,329
[45] Date of Patent: Oct. 31, 1995

[54] WEATHER PROTECTIVE COVER FOR VEHICLE

[76] Inventor: Tien-Chu Cheng, No. 65 Shui-Jing St., Yong-Yuan Village, Shin-She Hsiang, Taichung Hsien, Taiwan

[21] Appl. No.: 367,720

[22] Filed: Jan. 3, 1995

[51] Int. Cl.⁶ .................................................. B60J 11/00
[52] U.S. Cl. .......................... 296/98; 296/136; 160/24; 160/370.22
[58] Field of Search ................. 296/98, 136; 248/222.3, 248/224.2, 201; 160/23.1, 24, 323.1, 370.21, 370.22

[56] References Cited

U.S. PATENT DOCUMENTS 1,838,935  12/1931  Fixsen ................................ 248/222.3

FOREIGN PATENT DOCUMENTS

| | | | |
|---|---|---|---|
| 2242339 | 3/1974 | Germany | 296/136 |
| 3130531 | 6/1982 | Germany | 296/136 |
| 403266720 | 11/1991 | Japan | 296/136 |
| 1522367 | 8/1978 | United Kingdom | 296/136 |

*Primary Examiner*—Dennis H. Pedder
*Attorney, Agent, or Firm*—Morton J. Rosenberg; David I. Klein

[57] ABSTRACT

A protective cover for covering a vehicle includes two bases secured on top of the vehicle. A reel includes two tracks formed on the end portions. Two studs slidably engage with the tracks of the reel. Two connectors are pivotally coupled to the studs and each includes a room for engaging with the bases. One of the connectors has an upper member pivotally coupled to the stud and has a lower member rotatably coupled to the upper member. The protective cover can be easily secured on top of the vehicle and can be easily disengaged from the vehicle.

3 Claims, 5 Drawing Sheets

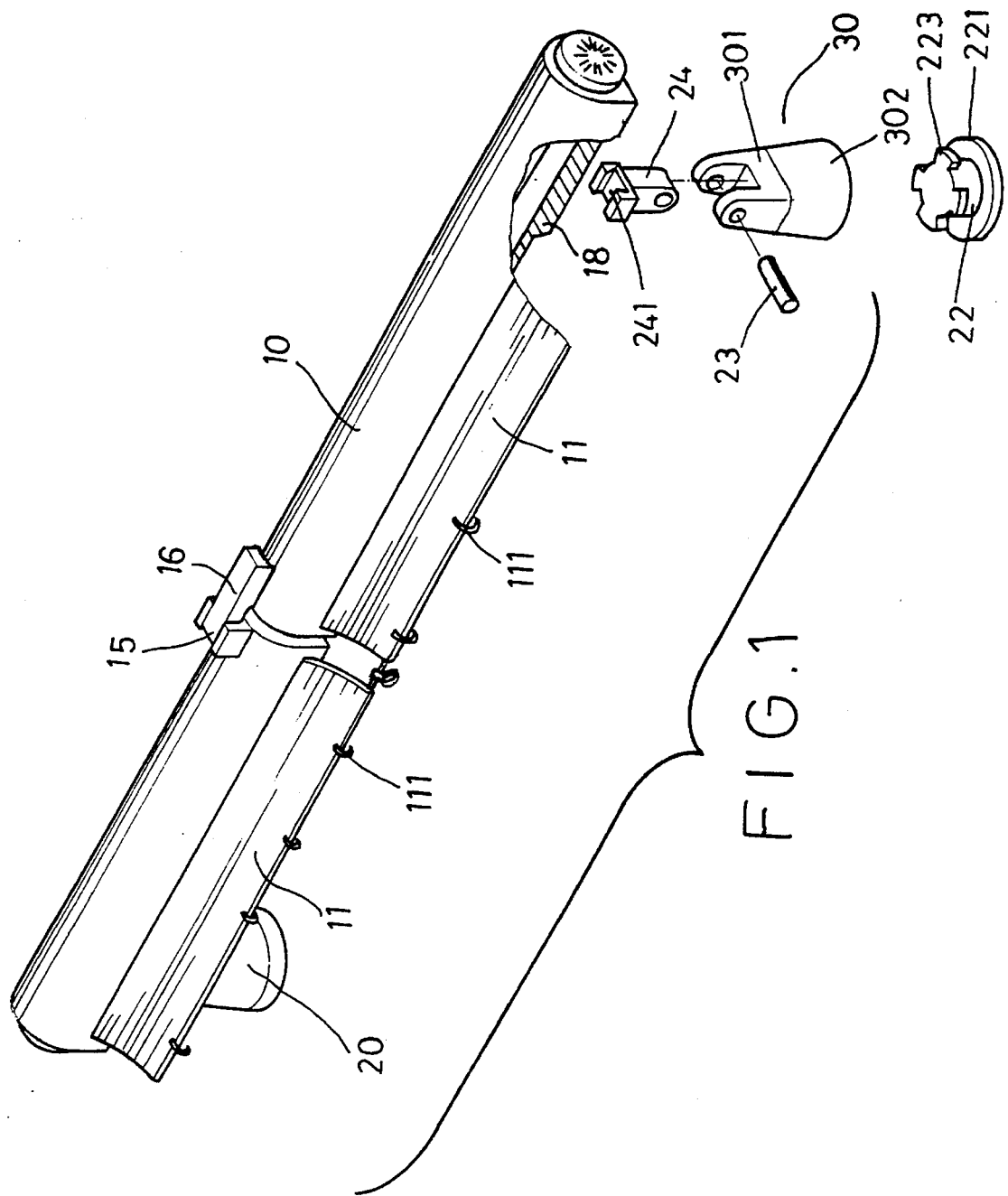

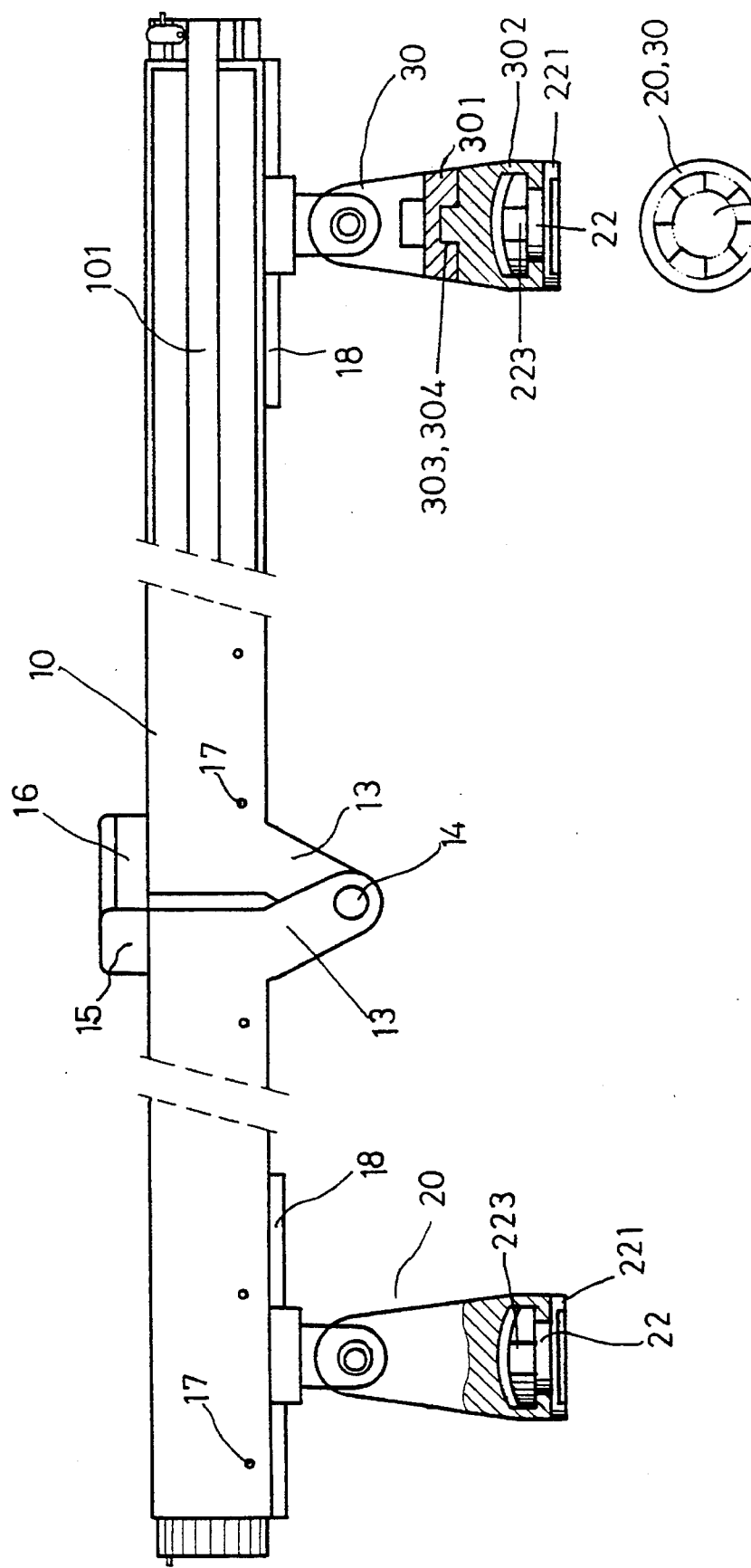

5,462,329

WEATHER PROTECTIVE COVER FOR VEHICLE

BACKGROUND OF THE INVENTION

1. Field of the Invention

The present invention relates to a cover, and more particularly to a weather protective cover for vehicle.

2. Description of the Prior Art

Typical vehicles may include a spring wound reel having a sheet material wound therein. The sheet material may be pulled outward of the reel for covering and for protecting the vehicles. However, normally, the spring wound reel is solidly secured in or on the vehicles and may not be easily disengaged from the vehicles for storing purposes.

The present invention has arisen to mitigate and/or obviate the afore-described disadvantages of the conventional protective covers for vehicles.

SUMMARY OF THE INVENTION

The primary objective of the present invention is to provide a weather protective cover which can be easily engaged with and disengaged from the vehicles.

In accordance with one aspect of the invention, there is provided a protective cover for a vehicle comprising two bases for securing on top of the vehicle, the bases each including a first engaging means provided thereon, a reel including two ends each having a track means provided thereon, two studs each including a channel means formed therein for slidably engaging with the track means of the reel, two bodies pivotally coupled to the studs respectively and each including a bottom portion having a room formed therein for engaging with the bases, the bodies each including a second engaging means provided in the rooms for engaging with the first engaging means so as to secure the bodies to the bases, the bodies including a first body having an upper member pivotally coupled to the stud and having a lower member rotatably coupled to the upper member, the room being formed in the lower member of the first body, and the first engaging means being engaged with the second engaging means when the lower member is rotated.

The first engaging means includes a plurality of teeth formed on the bases, the second engaging means includes a plurality of projections formed in the room so as to define a plurality of notches therebetween for engaging with the teeth, the teeth are engaged through the notches and are engaged with the projections when the lower member is rotated.

The reel includes two sections pivotally coupled together at a pivot pin, the two sections includes a first section having a socket formed therein and a second section having a latch for engaging with the socket so as to allow folding of the sections.

Further objectives and advantages of the present invention will become apparent from a careful reading of a detailed description provided hereinbelow, with appropriate reference to accompanying drawings.

BRIEF DESCRIPTION OF THE DRAWINGS

FIG. 1 is a partial exploded view of a weather protective cover in accordance with the present invention;

FIG. 2 is a partial cross sectional view of the engaging devices;

FIG. 3 is an end view of the engaging device;

DETAILED DESCRIPTION OF THE PREFERRED EMBODIMENT

Figure 4:
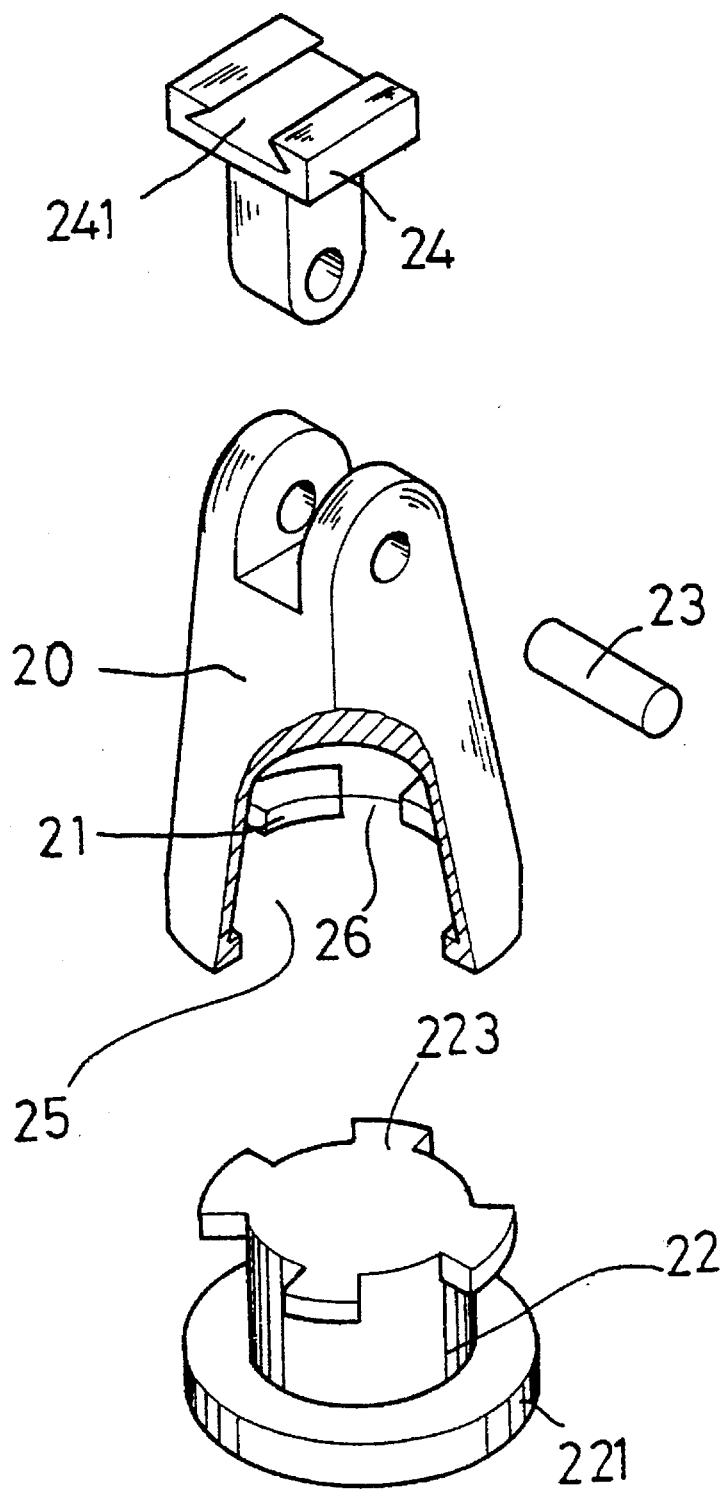
FIG. 4 is an exploded view of the engaging device.
Figure 5:
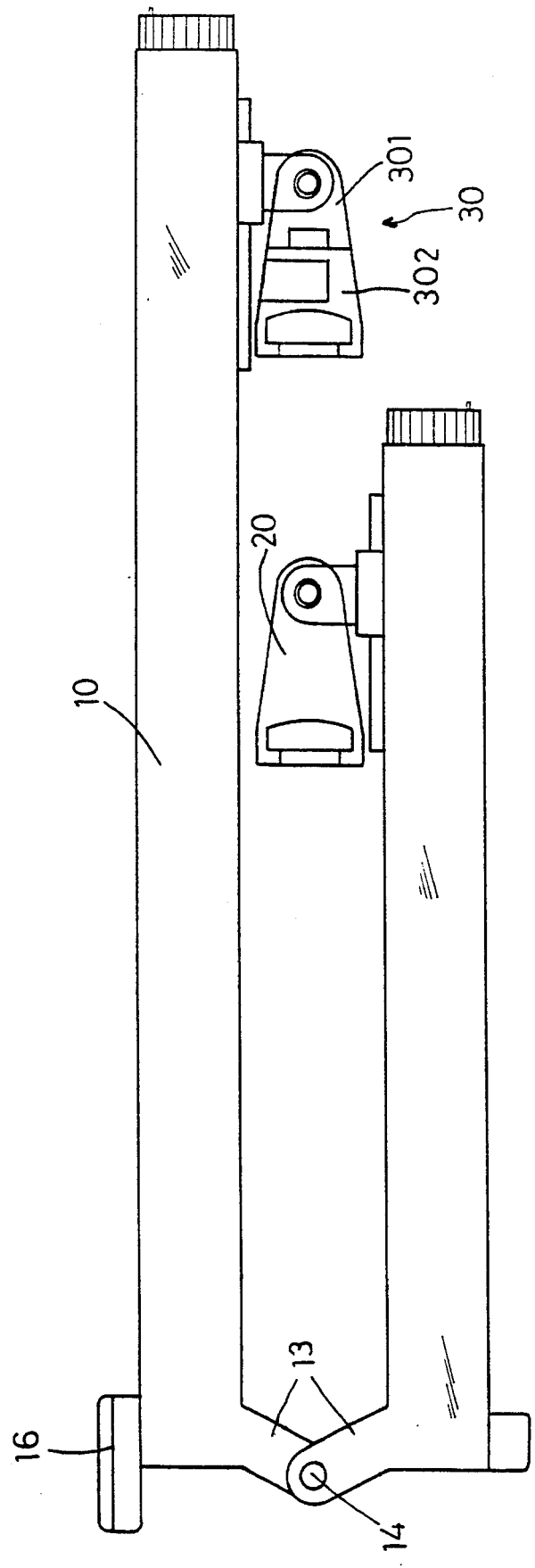
FIG. 5 is a plane view of the protective cover which is in folded configuration.
Figure 6:
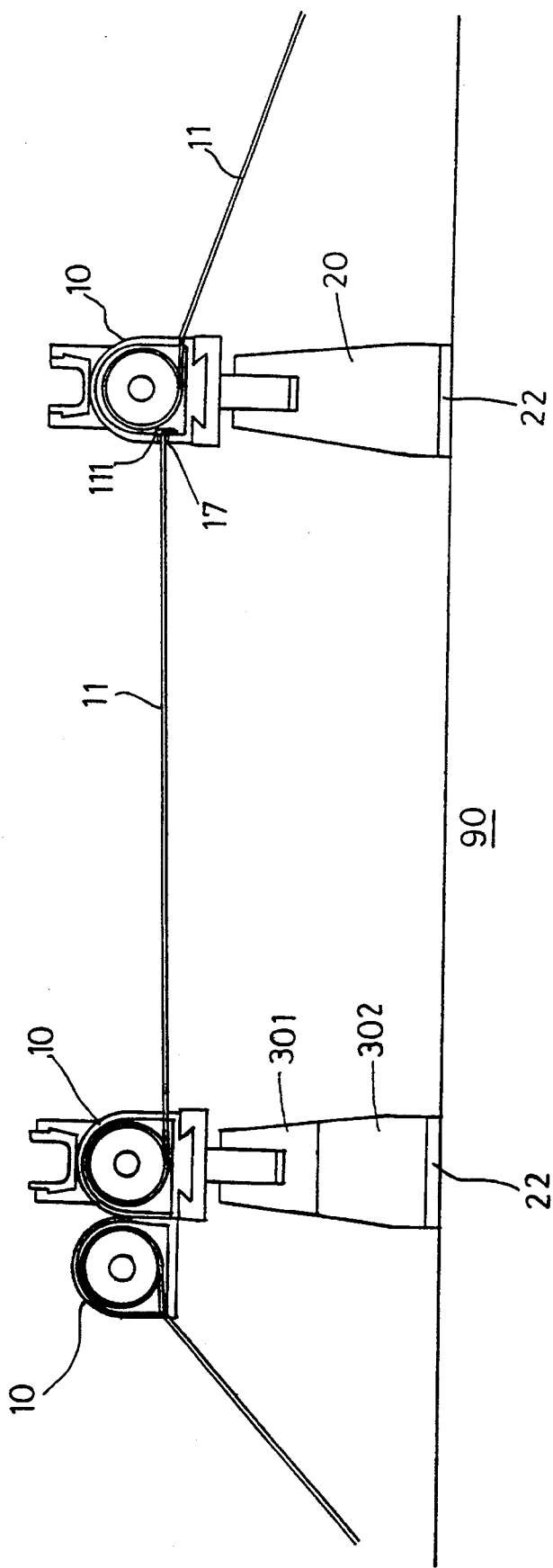
FIG. 6 is a schematic view illustrating the operation of the protective cover.

Referring to the drawings, and initially to FIGS. 1 to 4, a weather protective cover for a vehicle in accordance with the present invention comprises a spring wound reel 10 having an axle 101 rotatably supported therein. A sheet material 11 includes one end secured to the axle 101 and to be wound around the axle 101, and includes a number of hooks 111 provided on the other end thereof for hooking to other object so as to maintain the sheet material in an open position for covering the vehicle. The reel 10 includes a number of holes 17 formed in the rear portion for engaging with the hooks 111 of the other reels 10 so as to retain the sheet material in the open position (FIG. 6). The reel 10 includes two ends each having a track or a dovetail 18 longitudinally formed thereon. The reel 10 may include two sections each having an extension 13 pivotally coupled together at a pivot pin 14 and having a latch 16 for engaging with an engaging socket 15 of the other section such that the reel 10 may be folded about the pivot pin 14 to a configuration as shown in FIG. 5.

The protective cover further comprises two connectors 20, 30 for connecting and for securing the protective cover to the vehicle. The connectors 20, 30 each includes a body having a stud 24 pivotally coupled at the top by a pivot pin 23. The studs 24 each includes a dovetail slot 241 formed therein for slidably engaging with the dovetail 18 of the reel 10. A stop means is preferably provided on one end of the dovetail 18 for preventing the studs 24 from disengaging from the dovetail slot 18. The connectors 20, 30 each further includes a room 25 formed in the bottom portion for engaging with a base 22 and having a number of projections 21 extended radially inward so as to define a number of notches 26 therebetween. The base 22 each includes a bottom 221 secured on top of the vehicle and each includes a number of teeth 223 extended radially outward from the upper portion for engaging with the notches 26 of the bodies 20, 30 and for engaging with the projections 21 so as to secure the bodies 20, 30 and the base 22 together.

As best shown in FIG. 2, the body 30 includes an upper member 301 having a cavity 303 formed therein for rotatably receiving a stub 304 of the lower member 302 such that the lower member 302 is rotatable relative to the upper member 301.

In operation, as shown in FIGS. 1, 2 and 6, the bases 22 are secured on top of the vehicle 90. The body 20 is first engaged with the base 22 by engaging the teeth 223 relatively through the notches 26 of the body 20 and by rotating the body 20 relative to the base 22 for about 45 degrees such that the teeth 223 may engage with the projections 21 and such that the body 20 may be secured to the base 22. At this moment, the room 25 of the other body 30 is aligned and engaged with the other base 22. The lower member 302 may be rotated to align the notches 26 with the teeth 223 of the base 20 such that the teeth 223 may move through the notches 26. The lower member 302 is then rotated until the teeth 223 are engaged with the projections 21 of the body. It is preferable that the teeth 223 are engaged with the projections 21 by force-fitted engagement so as to secure the bodies 20, 30 to the bases 22.

Referring next to FIG. 6, two reels 10 may be secured together for covering the upper portion and the front portion of the vehicle 90, and another reel 10 is disposed on the rear portion of the vehicle for covering the rear portion of the vehicle. The sheet material 11 may also includes a length long enough for covering the whole vehicle.

Accordingly, the protective cover in accordance with the present invention may be easily secured on top of the vehicle for covering the vehicle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A protective cover for a vehicle comprising:

two bases for securing on top of said vehicle, said bases each including a first engaging means provided thereon, a reel including two ends each having a track means provided thereon, two studs each including a channel means formed therein for slidably engaging with said track means of said reel, two connectors pivotally coupled to said studs respectively and each including a bottom portion having a room formed therein for engaging with said bases, said connectors each including a second engaging means provided in said rooms for engaging with said first engaging means so as to secure said connectors to said bases, one of said connectors including an upper member pivotally coupled to said stud and having a lower member rotatably coupled to said upper member, said room being formed in said lower member of said one of said connectors, and said first engaging means being engaged with said second engaging means when said lower member is rotated.

2. A protective cover according to claim 1, wherein said first engaging means includes a plurality of teeth formed on said bases, said second engaging means includes a plurality of projections formed in said room so as to define a plurality of notches therebetween for engaging with said teeth, said teeth are engaged through said notches and are engaged with said projections when said lower member is rotated.

3. A protective cover according to claim 1, wherein said reel includes two sections pivotally coupled together at a pivot pin, said two sections includes a first section having a socket formed therein and a second section having a latch for engaging with said socket so as to allow folding of said sections.

* * * * *